W. J. EDWARDS.
FORK SPREADER FOR BICYCLES.
APPLICATION FILED SEPT. 23, 1913.
1,135,271. Patented Apr. 13, 1915.
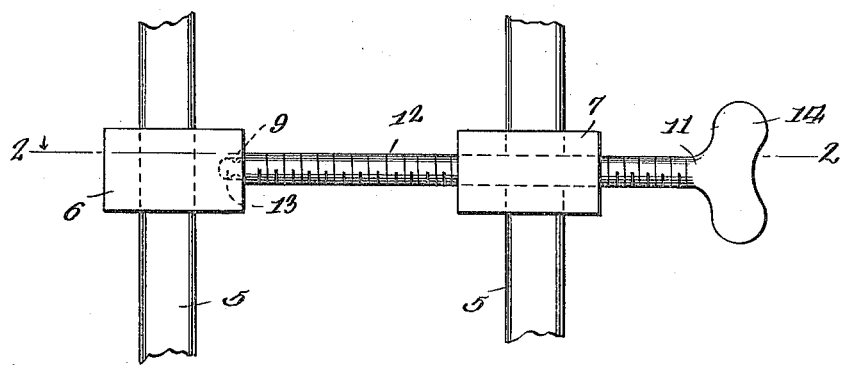
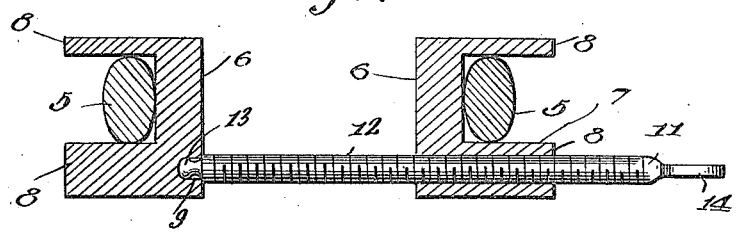
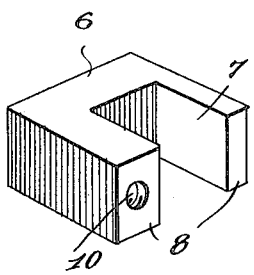
Witnesses
G. M. Spring
B. J. Garvey Jr.
Inventor
William J. Edwards,
By
his Attorney

UNITED STATES PATENT OFFICE.

WILLIAM JOHN EDWARDS, OF VULCAN, MICHIGAN.

FORK-SPREADER FOR BICYCLES.

1,135,271.     Specification of Letters Patent.     Patented Apr. 13, 1915.

Application filed September 23, 1913. Serial No. 791,365.

*To all whom it may concern:*

Be it known that I, WILLIAM J. EDWARDS, a citizen of the United States, residing at Vulcan, in the county of Dickinson and State of Michigan, have invented certain new and useful Improvements in Fork-Spreaders for Bicycles, of which the following is a specification.

This invention relates to a novel and useful tool which is especially adapted for use in spreading the forks of a bicycle or the like, having for its primary object to provide a device which will be relatively small so as to be readily carried in the ordinary tool bag of a bicycle, likewise providing a device which will be durable, and expeditiously manipulated.

An object of this invention is to provide a simple and efficient means which may be readily engaged with the forks of a bicycle for spreading the same when it is desired to remove the wheel from therebetween.

Other objects as well as the nature, characteristic features and scope of my invention will be more readily understood from the following description taken in connection with the accompanying drawings and pointed out in the claims forming a part of this specification.

Referring to the drawing:—Figure 1 is a side elevation of the device constructed in accordance with my invention demonstrating the application thereof; Fig. 2 is a sectional view taken on the line 2—2 of Fig. 1; and, Fig. 3 is a detail enlarged perspective view of one of the fork-embracing blocks.

In the drawings wherein is illustrated the preferred embodiment of this invention, in order to illustrate the application thereof, a pair of bicycle forks 5 is provided, which may be of the ordinary or any desired form, being in engagement with my improved fork-embracing blocks 6, each of which is preferably of a substantially rectangular configuration having a portion 7 thereof cut out so as to provide spaced-apart parallel jaws or arms 8 which engage with the forks, the one of said blocks being provided with a recess 9 therein, while the opposite block is provided with a threaded bore 10.

In order to manipulate the blocks so as to cause the same to be actuated to and from each other as desired, a screw bolt 11 is provided in the present instance, which is preferably of an elongated cylindrical configuration provided with external screw-threads 12 on the periphery thereof and having the one end thereof reduced as indicated at 13 and preferably of a spheroidical contour, the opposite end thereof being formed so as to provide a key 14 for facilitating the turning of the screw bolt 11 and incidentally the actuation of the blocks 6 which are associated therewith.

In reduction to practice the reduced end 13 of the screw bolt 11 is engaged in the recess 9 of one of the blocks 6 as advantageously illustrated in Figs. 1 and 2 of the drawings, while the external thread 12 of said bolt is engaged with the internal thread 10 of the opposite block.

In operation, the cut out portions 7 of the blocks 6, are engaged with the inner faces of the forks 5, and pressure exerted on the key end 14 of the screw-bolt 11, causing the blocks 6 to be actuated to or from each other, according to the direction in which the key 14 is actuated. By making the end 13 preferably of a spheroidical contour, it is obvious that the rotation thereof in the recess 9 will be facilitated for performing the desired function.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A spreader for bicycle forks including a pair of U-shaped blocks, the closed ends of the U being arranged in proximity and in parallelism to each other, the parallel arms of each of said blocks adapted to embrace one of the bicycle forks, and means associated with said blocks for moving the same toward or from each other.

2. A spreader for bicycle forks including a pair of U-shaped blocks the closed ends of the U being arranged in proximity and in parallelism to each other, the parallel arms of each of the blocks adapted to embrace the bicycle forks, one of the arms of each of said blocks being enlarged, and a screw-bolt threaded through the enlarged arm of one of said blocks and rotatably mounted in the enlarged arm of the opposite block, whereby movement of said bolt actuates said block.

In testimony whereof I affix my signature in presence of two witnesses.

WILLIAM JOHN EDWARDS.

Witnesses:
 H. K. MYERS,
 JOHN EDWARDS.

Copies of this patent may be obtained for five cents each, by addressing the "Commissioner of Patents, Washington, D. C."